US006834556B2

(12) United States Patent
Cain et al.

(10) Patent No.: US 6,834,556 B2
(45) Date of Patent: Dec. 28, 2004

(54) TECHNIQUES FOR MONITORING HEALTH OF VESSELS CONTAINING FLUIDS

(75) Inventors: Russell P. Cain, Columbia, MD (US); Bliss G. Carkhuff, Laurel, MD (US); John M. Bacon, Chesapeake Beach, MD (US)

(73) Assignee: The Johns Hopkins University, Baltimore, MD (US)

( * ) Notice: Subject to any disclaimer, the term of this patent is extended or adjusted under 35 U.S.C. 154(b) by 55 days.

(21) Appl. No.: 10/286,054

(22) Filed: Nov. 1, 2002

(65) Prior Publication Data

US 2003/0079553 A1 May 1, 2003

Related U.S. Application Data

(60) Provisional application No. 60/334,629, filed on Nov. 1, 2001.

(51) Int. Cl.[7] .................................................. G01F 1/32
(52) U.S. Cl. .................................................... 73/861.24
(58) Field of Search .............................. 73/861.27, 850, 73/865.9, 827, 865.8, 49.2, 46.3, 52, 865.5, 152.01

(56) References Cited

U.S. PATENT DOCUMENTS

| 3,575,040 | A | | 4/1971 | Bosselaar ...................... 73/40.5 |
| 3,903,729 | A | | 9/1975 | Covington ................. 73/40.5 R |
| 4,308,746 | A | | 1/1982 | Covington ..................... 73/40.5 |
| 4,452,087 | A | | 6/1984 | D'Antonio ..................... 73/786 |
| 4,549,437 | A | | 10/1985 | Weins et al. .................... 73/587 |
| 4,945,775 | A | * | 8/1990 | Adams et al. ................. 73/865.8 |
| 5,065,631 | A | | 11/1991 | Ashpitel et al. ................ 73/849 |
| 5,117,676 | A | | 6/1992 | Chang ....................... 73/40.5 A |
| 5,333,501 | A | | 8/1994 | Okada et al. ................... 73/592 |
| 5,485,148 | A | | 1/1996 | Tseng ..................... 340/825.54 |
| 5,581,037 | A | | 12/1996 | Kwun et al. .................... 73/623 |
| 5,980,102 | A | | 11/1999 | Stulen et al. ................... 374/45 |
| 5,987,990 | A | | 11/1999 | Worthington et al. ........ 773/592 |
| 6,082,193 | A | | 7/2000 | Paulson .................... 73/152.58 |
| 6,155,292 | A | | 12/2000 | Kurata ......................... 137/552 |
| 6,417,488 | B1 | * | 7/2002 | Takeuchi et al. ........ 219/130.01 |
| 6,476,624 | B1 | * | 11/2002 | Chuman et al. ............. 324/718 |
| 6,715,914 | B1 | * | 4/2004 | Fesmire et al. ................ 374/45 |

OTHER PUBLICATIONS

"Evaluation of Pipeline Leak Detection Systems", by WD Glauz et al., ASTM Special Technical Publication n 1161 1993. Publ by ASTM, Philadelphia, PA, USA, p. 151–161, 1993.

"Tennessee Gas Maximizes Control Over Pipeline System", by Anon, Pipeline and Gas Journal, v. 222, n. 2 Feb. 1995, p. 46–47, 1995.

"Control of Critical Piping with the Mannesmann Lifetime Monitoring System (MLM)", by G Buehl et al, Abbreviated Journal Title–Drel(3) R, Rohre, Rohrleitungsbau, Rohrleitungstransport, vol. 34, No. 9, 1995, pp. 464–469, 472.

* cited by examiner

Primary Examiner—Edward Lefkowitz
Assistant Examiner—Jewel Thompson
(74) Attorney, Agent, or Firm—Francis A. Cooch

(57) ABSTRACT

Some techniques for monitoring health of a vessel include attaching a sensor suite of one or more sensors to an outer skin of the vessel and providing power for the sensor suite based on a temperature difference between a fluid temperature of a contained fluid inside the vessel and an ambient temperature outside the vessel. Some techniques include attaching a sensor suite by cinching a belt around the vessel and causing two ends of a strain gauge in the sensor suite to become rigidly attached to the outer skin of the vessel, for example, on opposite sides of a weld joining two sections of the vessel. These techniques allow a pipeline to be readily instrumented and monitored remotely which reduces manpower costs for performing manual inspections, reduces the risks of injury from performing manual inspections during hazardous weather conditions, and reduces the likelihood of undetected leaks.

34 Claims, 4 Drawing Sheets

TECHNIQUES FOR MONITORING HEALTH OF VESSELS CONTAINING FLUIDS

CROSS-REFERENCE TO RELATED APPLICATIONS

This application claims benefit of Provisional Appln. 60/334,629, filed Nov. 1, 2001, the entire contents of which is hereby incorporated by reference as if fully set forth herein, under 35 U.S.C. §119(e).

BACKGROUND OF THE INVENTION

1. Field of the Invention

The present invention relates to monitoring health of a vessel containing fluids, such as a pipeline carrying oil from oil fields to an oil depot. In particular, the current invention relates to monitoring health of a vessel using a sensor suite that is easily attached to an outer skin of the vessel.

2. Description of the Related Art

The past approaches described in this section could be pursued, but are not necessarily approaches that have been previously conceived or pursued. Therefore, unless otherwise indicated herein, the approaches described in this section are not to be considered prior art to the claims in this application merely due to the presence of these approaches in this background section.

Pipelines are of great commercial importance. For example, oil pipelines carry crude oil from the frozen, relatively inaccessible Arctic regions to more accessible ports where the oil is loaded onto tankers for transport to oil markets. Other pipelines carry natural gas and chemicals from remote regions to processing stations. These pipelines are constructed by welding together sections of pipe. For example, sections of pipe with diameters of about four feet and lengths of about 40 feet are welded together in the Trans-Alaskan pipeline. Economies of great industrial states depend on the reliable transport of oil and other fluid commodities, such as natural gas, slurries, and chemicals, through such pipelines.

When a failure occurs in a pipeline, large costs are incurred. For example, leaks and ruptures in an oil pipeline may lead to the spillage of hundreds of thousands to millions of gallons of crude oil into the area surrounding the region. The Trans-Siberian Oil Pipeline typically releases five percent (5%) to seven percent (7%) of its transported oil each year; in 1991 alone that amounts to about seven million (7,000,000) barrels. Recently, a corroded pipeline spilled roughly one hundred thousand (100,000) gallons of crude oil and saltwater onto the Alaskan tundra. Although a crew plugged the leak in twelve minutes, the spillage endangered the crew's lives and polluted a large area.

Much of the spilled oil is lost into the ground leading to a cost related to the current market price for that lost oil. In addition, the spillage pollutes the environment in the area for an extended period of time, leading to short-term additional costs while that environment is unusable, and long-term costs while that environment is contaminated. Further costs are involved in cleaning up the environment to restore it to a useful or less contaminated state. Additional costs are incurred if the spillage occurs in an environmentally sensitive area because either additional clean-up is mandated by law or biodiversity is diminished by the contamination, or both. Furthermore, costs are incurred while the pipeline is shut down for repair. Natural gas or chemical leaks can be substantially more dangerous.

To reduce the costs of such failures, significant efforts are expended to monitor the health of pipelines to detect faults before they lead to rupture and spillage, or to quickly detect rupture and shut down the transport of fluid through the pipeline to reduce the spillage that does occur. Monitoring and maintenance costs for pipeline structures may exceed the original installation costs for the pipeline.

In one approach, persons patrol the pipeline and manually inspect the pipe to detect and repair faults that may lead to ruptures. This is a time consuming process, and human involvement can become expensive. A significant hindrance to this approach is the length of the pipeline and the hostile environment along great sections of this length. A pipeline may be about a thousand miles long or longer. Environmental conditions along the pipeline may be harsh and hazardous to humans. In the Arctic, during winter months, much of the pipeline's length is in complete darkness, under many feet of snow, at temperatures well below freezing, and subjected to high winds. If a pipe does rupture, a great deal of oil may spill in the time between visits by a human inspector.

In another approach, the fluid flow is cut off through a segment of the pipeline between valves, and robots with inspection equipment pass through the empty pipe sections looking for faults. For example, robots called "pigs" carry video equipment that sends pictures back to a control room where they are viewed by human observers. While sufficient for many purposes, and less expensive than human inspectors, there are some deficiencies. One disadvantage is that fluid flow must be turned off while the pigs run through pipe sections in the segment. Another disadvantage is that ruptures that occur while fluid is being transported are not detected.

In another approach, instruments are installed at various locations along the pipeline to detect faults and ruptures. However this approach is not considered practical for long pipelines for a variety of reasons.

One reason that this approach is not considered practical is that instruments require a power source, such as electrical power, and generators used for electrical power are far apart because the pipelines pass through large unpopulated areas. Power lines are not currently available along the entire length of many pipelines. Simple wires running parallel to the pipeline for power are subject to attenuation and are difficult to maintain. Batteries have short lifetimes in many of the extreme conditions that predominate along some pipelines, so they involve frequent visits for replacement. Windmills provide power only intermittently and solar panels are useless many months of the year in arctic regions.

In addition, it is difficult to install and maintain different sensors along the great length of the pipe. In many cases, the fluid flow through a segment of pipe between valves must be shut down so that sensors, such as pressure sensors, can be installed inside sections of the pipe. While the pipeline is carrying fluid it is difficult to determine whether the sensors are still in place and working. If a sensor needs repair or replacement, flow through the segment may have to be shut down for some period of time.

Furthermore it is difficult to communicate with the sensors once installed. Simple wires running parallel to the pipeline for data communication are subject to attenuation and are difficult to maintain, as are lines for power. Radio transmitters to transmit data over hundreds of miles consume considerable amounts of power that rapidly deplete batteries.

Based on the foregoing, there is a clear need for techniques to monitor the health of pipelines that do not suffer the disadvantages of the above approaches. For example, there is a need for techniques to monitor pipeline health that are automatic, inexpensive, easy to install, and do not require wires for power or communication.

SUMMARY OF THE INVENTION

Techniques are provided for monitoring health of a vessel. In one aspect of the invention, a method includes attaching a sensor suite of one or more sensors to an outer skin of the vessel and providing power for the sensor suite based on a temperature difference between a fluid temperature of a contained fluid inside the vessel and an ambient temperature outside the vessel.

According to an embodiment of this aspect, the sensor suite is connected to a transmitter to communicate data based on sensor output from the sensor suite to a receiver. Power for the transmitter is also provided based on the temperature difference.

According to another embodiment using the transmitter, multiple communication relays are provided at corresponding locations along the vessel, each relay including a receiver and a transmitter for communicating the data based on the sensor suite. Power for each communication relay is based on a temperature difference between the contained fluid inside the vessel and an ambient temperature outside the vessel in the vicinity of the communication relay.

According to another embodiment of this aspect, the sensor suite is connected to a processor to generate data based on sensor output from the sensor suite. Power is provided for the processor based on the temperature difference.

According to another embodiment of this aspect, the processor is configured to determine whether output from the sensor suite deviates by more than a threshold amount from a baseline output that is associated with normal conditions for the vessel.

According to another aspect of the invention, a method includes cinching around an outer skin of the vessel, at a weld between successive sections of the vessel, a belt that contains a sensor suite of one or more sensors. Cinching the belt causes two ends of a strain gauge in the sensor suite to become rigidly attached to the outer skin of the vessel on opposite sides of the weld.

According to another aspect of the invention, an apparatus for monitoring health of a vessel includes a belt for cinching around an outer skin of the vessel at a location along the vessel. The belt further includes multiple biting members for rigidly attaching to the outer skin of the vessel when the belt is cinched around the vessel. The belt also includes a strain gauge for measuring change in distance between two ends of the strain gauge. Each end of the two ends is rigidly attached to a different one of the biting members.

According to another aspect of the invention, an apparatus for monitoring health of a vessel includes a belt for cinching around an outer skin of the vessel at a location along the vessel. The belt includes a sensor suite of one or more sensors for measuring properties related to the health of the vessel. The apparatus includes a thermopile that generates power based on a temperature difference between a first thermocouple of the thermopile and a second thermocouple of the thermopile. The first thermocouple is connected to the belt for making thermal contact with the outer skin of the vessel. The second thermocouple is configured for exposure to an ambient temperature of an environment outside the vessel. Power generated by the thermocouple powers the sensor suite.

According to another aspect of the invention, a pipeline includes multiple pipe sections welded together. A belt is cinched around an outer skin of a pipe section at a location along the pipeline. The belt includes multiple biting members rigidly attached to the outer skin of the pipeline. The belt also includes a strain gauge for measuring change in distance between two ends of the strain gauge. Each end of the two ends is rigidly attached to a different one of the biting members.

According to another aspect of the invention, a pipeline includes multiple pipe sections welded together. A belt is cinched around an outer skin of a pipe section at a location along the pipeline. The belt includes a sensor suite of one or more sensors for measuring properties related to health of the pipeline. The pipeline also includes a thermopile that generates power based on a temperature difference between a first thermocouple of the thermopile and a second thermocouple of the thermopile. The first thermocouple is connected to the belt in thermal contact with the outer skin of the pipeline. The second thermocouple is exposed to an ambient temperature of an environment outside the pipeline. Power generated by the thermocouple powers the sensor suite.

These techniques allow automatic, stand-alone, self-powered instrument suites to be easily deployed along a pipeline. For example, in embodiments in which the instrument suites are installed at each weld as each weld is inspected according to current schedules, an entire pipeline can be instrumented at reasonable costs within a few years of inspections. These techniques also allow the instrumented pipeline to be monitored remotely which reduces manpower costs for performing manual inspections, reduces the risks of injury from performing manual inspections during hazardous weather conditions, and reduces the likelihood of undetected leaks. The reduction in the likelihood of leaks is not only a cost benefit to those transporting fluids through a pipeline and to those who must clean up the spills, but is also a benefit to the environment and the population in the areas surrounding the pipeline.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for monitoring the health of a vessel that contains a fluid are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

1. Operational Context

In the following description, embodiments of the invention are described in the context of an oil pipeline, but the invention is not limited to this context. Other embodiments of the invention are deployed in other contexts. For example, embodiments of the invention are deployed for other fluids in pipelines, such as natural gas, liquid or gaseous chemicals in chemical plants, liquid or gaseous components in pharmaceutical plants, slurries of pulp in paper plants, slurries of ore in mining operations, or slurries of construction materials at a construction site, among others. Embodiments of the invention may also be deployed for other vessels than pipelines, such as nuclear reactors, reaction chambers, and tanks on trucks, trailers, railroad cars, and ships, among others.

2. Monitoring Apparatus

Figure 1:
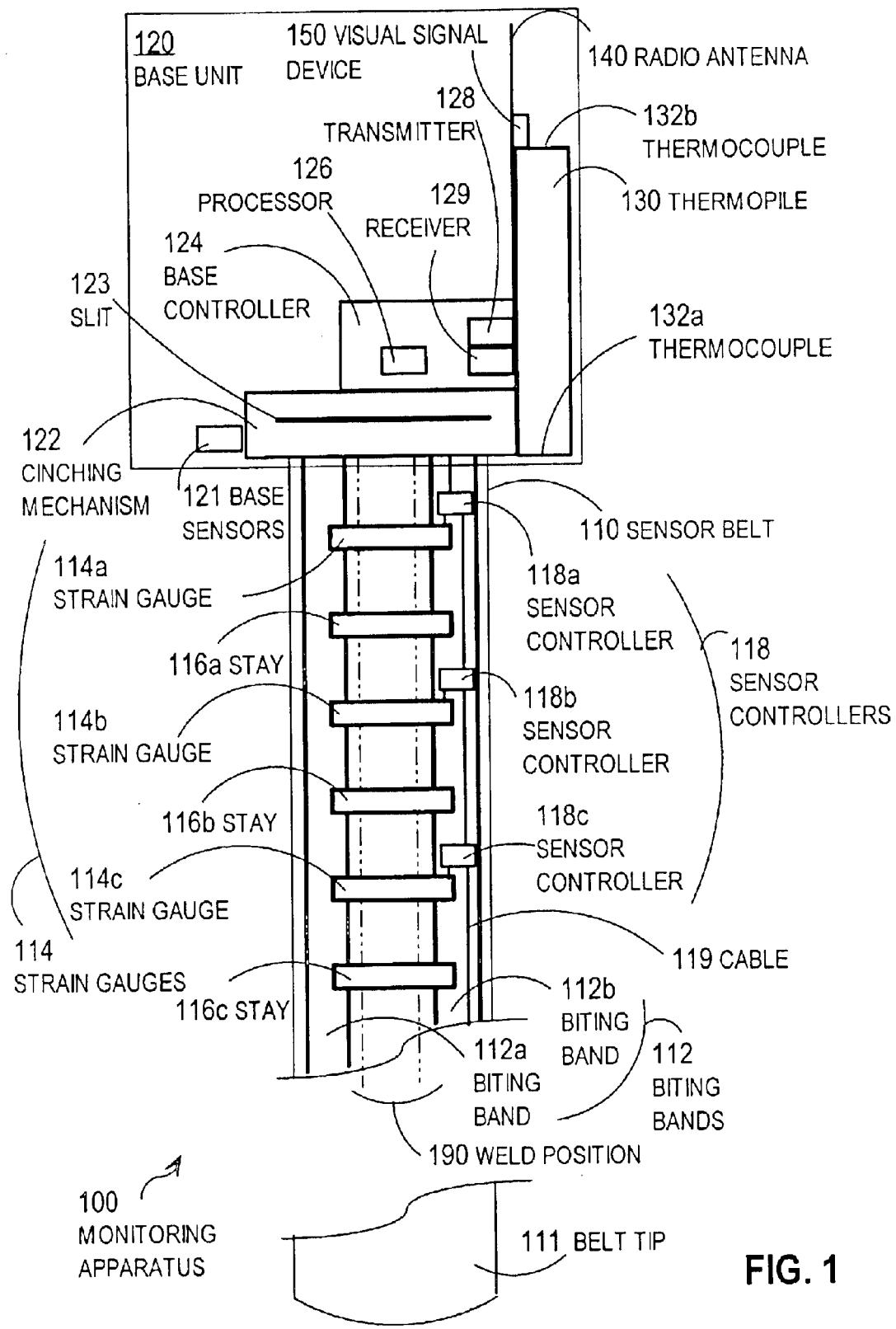
FIG. 1 is a block diagram that illustrates a monitoring apparatus that can be readily attached to a vessel such as a pipeline, according to an embodiment.

FIG. 1 is a block diagram that illustrates a monitoring apparatus 100 that can be readily attached to a vessel such as a pipeline, according to an embodiment. The monitoring apparatus 100 includes a base unit 120 and a suite of one or more sensors to be arranged on the outer surface, or skin, of the vessel. For purposes of illustration, it is assumed hereinafter that the vessel is a pipeline. In the illustrated embodiment, the suite of one or more sensors is arranged on a sensor belt 110; in other embodiments, the suite of one or more sensors is not arranged on a belt 110. According to some embodiments, commercial, off-the-shelf (COTS) components are used to reduce the cost of the monitoring apparatus.

2.1 Sensor Belt

In the illustrated embodiment, the sensor belt 110 is sufficiently long to encircle the pipeline, and the base unit 120 includes a cinching mechanism 122. For example, for a pipeline made up of pipes having circular cross sections with diameters of four feet, the belt is longer than about 12.6 feet, the cross-sectional circumference of each pipe. The full length of the belt is not depicted in FIG. 1; instead a break is shown between the portion of the sensor belt 110 attached to base unit 120 and a free tip 111 of the sensor belt 110. In the illustrated embodiment, the sensors arranged on the belt 110 are brought in contact with the pipeline by encircling the pipeline with the sensor belt 110, and feeding the belt tip 111 into a slit 123 in the cinching mechanism 122. The cinching mechanism 122 can be operated to pull the belt tip 111 through the slit 123 until the sensor belt 110 is taught against the pipeline for substantially all of the length of the sensor belt and to lock the belt in that configuration. Any cinching mechanism known in the art when the monitoring apparatus is assembled may be used as the cinching mechanism 122.

A sensor belt may be made of any suitably strong and flexible material. In one embodiment, a structural matrix for the sensor belt is provided by a fabric strap made of Kapton, which is strong, flexible and inexpensive.

The sensor belt 110 includes one or more sensors for mounting on the skin of the pipeline. In the illustrated embodiment, the sensor belt 110 includes multiple strain gauges 114, including strain gauges 114a, 114b, 114c. In other embodiments other sensors are included instead of or in addition to the strain gauges. The strain gauges 114 and related components in sensor belt 110 are described in more detail in the next section.

The sensor belt 110 includes cables 119 to deliver electrical power to the sensors and to receive output signals from the sensors. In an embodiment, the electrical cable is a flexible metal wire embedded in the Kapton strap. In the illustrated embodiment, the source of electrical power is a thermopile 130 in the base unit 120, described in more detail below.

In the illustrated embodiment, the sensor belt 110 includes a sensor controller 118 for a group of one or more sensors, such as sensor controllers 118a, 118b, 1118c for strain gauges 114a, 114b, 114c, respectively. In an embodiment, the controllers are embedded in the Kapton strap. The sensor controller 118 performs one or more functions associated with each group of one or more sensors, such as providing power to the sensor, initializing the sensor, querying the sensor for data, receiving an output signal from the sensor, preparing data based on the output signal from the sensor, and sending the data to a base controller 124 in the base unit 120. The base controller 124 is described in more detail in a later section.

In some embodiments, the sensor controller controls one or more other sensors. For example, in various embodiments, one or more sensor controllers each control a temperature sensor or an acoustic sensor or a vibration sensor or a corrosion sensor or a hydrocarbon sensor or some combination of theses sensors. Temperature sensors distributed around the pipe are useful in detecting leaks of a fluid that is at a different temperature from ambient temperature. Vibration and acoustic sensors are useful in determining when and where an outside object contacts the pipeline, as well as when and where a rupture occurs. Corrosion sensors can detect problems at a weld before the weld leaks. Hydrocarbon and vapor sensors can detect methane and other hydrocarbon byproducts that indicate leaks from an oil or natural gas pipeline. In some embodiments, one or more sensors are integrated with the controller. In some embodiments, one or more sensors are embedded in the Kapton strap and connected to the controller with cable 119.

2.2 Strain Gauges in the Sensor Belt

A strain gauge measures the change in distance between two active spots on the strain gauge. Any strain gauge known in the art at the time the monitoring apparatus is assembled may be used as the strain gauges 114. To measure strain in the pipeline, the two active spots of each strain gauge should be rigidly anchored to two corresponding locations on the pipeline. Strain in the pipeline can be related to stress in the pipeline in the vicinity of the gauge and therefore to the risk of a leak or rupture at that location.

In the illustrated embodiment, the sensor belt 110 includes two biting bands 112, including biting bands 112a, 112b for rigidly attaching strain gauges to two locations on the pipeline. In some embodiments, the biting bands are embedded in the Kapton strap. The biting bands 112 are configured to become rigidly attached to the skin of the pipeline when the sensor belt 10 is cinched to be taught. For example, the two biting bands 112a, 112b run parallel to each other and to a longitudinal axis of the sensor belt 110. Each biting band includes small knobs or teeth on the surface of the band that contacts the pipeline. The teeth dig slightly into the skin of the pipeline so that the bands become bound to the pipeline. When the pipeline stretches or compresses, the bands move apart or together in concert with the pipeline. The two active spots of each strain gauge 114 are anchored to a different one of the biting bands 1112. In other embodiments, more than two biting bands may be included in sensor belt 110, and different strain gauges may be anchored to different pairs of biting bands.

In the illustrated embodiment, each strain gauge generates an electronic signal that depends on the tension applied to a tension element, such as a spring. In order to respond to both compressive strains and expansive strains, the strain gauges of the illustrated embodiment are to be under tension when attached to the pipeline. To keep tension on the strain gauges and to prevent the strain gauges from distorting the biting bands before the belt is cinched to the pipeline, one or more removable stays 116, such as stays 116a, 116b, 116c, are attached to the biting bands 112. After the belt is cinched and the biting bands are rigidly attached to the pipeline, the removable slays 116 are removed. Any method for keeping tension from distorting the biting bands with removable stays may be used. For example, in one embodiment, the removable stays are thin rigid bars with flanges that fit into groves in the biting bands. When in place, the rigid bars and flanges prevent distortion of the biting bands 112 by the tension in the strain gauges 114. The stays are attached to a cord so that when the cord is pulled away from the pipeline, the flanges on the stays exit the grooves, and the stays fall away.

In the illustrated embodiment, the lengths of the strain gauges and the spacing between two biting bands 112a, 112b are selected to span a weld between two sections of a pipeline. The weld position relative to the biting bands 112 when the sensor belt 110 is in place around a pipeline is illustrated in FIG. 1 by the weld position 190, represented by parallel broken lines.

In an embodiment, strain gauges 114, with associated sensor controllers 118 that include integrated temperature sensors, are included every three inches along the sensor belt 110. Each strain gauge measures compression and expansion with a precision of about ±10 $\mu$strain. Each temperature sensor measures temperature with a precision of about ±1° F. According to this embodiment, a sensor belt 110 for a four foot diameter pipe would have about 50 strain gauges 114 with associated controllers 118 and temperature sensors distributed along sensor belt 110. The distributed strain gauges should locate the position of the weld most likely to fail first. The distributed temperature sensors should detect the presence of any warm oil that leaks from inside the pipe and locate the leak at a position around the weld.

2.3 The Base Unit

In the illustrated embodiment, the base unit 120 includes the cinching mechanism 122, the base controller 124, base sensors 121, radio antenna 140, visual signal device 150, and thermopile 130. In other embodiments, one or more of these components are omitted, but not all of them are omitted. The cinching mechanism 122 is described above with reference to the sensor belt.

2.3.1 The Base Sensors

The base sensors 121 include any sensors that are useful but that are not distributed around the pipeline. For example, base sensors may include chemical detectors and weather sensors that indicate the air temperature, wind speed, wind direction, precipitation, sunlight levels, humidity, barometric pressure, or other environmental properties. The chemical detector is useful in a pocket under an insulation layer around the pipeline for determining whether a leak has occurred nearby. Chemical detectors are commercially available for methane, ammonia, hydrogen, Chlorinated-fluorocarbons (CFCs) hydrocarbons and a variety of other gases. The weather measurements are useful in determining how hazardous conditions are for visiting a site where an inspection is scheduled or the other sensors indicate maintenance or repair of the pipeline is warranted. Output signals from these sensors are sent to the base controller 124. Any sensors known when the monitoring apparatus is fabricated may be incorporated; for example weld integrity sensors currently under development may be included.

In an embodiment, the base sensors 121 include an acoustic sensor in physical contact with the pipeline to detect contact with the pipeline by an outside agent, including hostile human activity. The acoustic sensor in this embodiment has a frequency response from about 100 cycles per second (also called Hertz, abbreviated "Hz") to about 10,000 Hz, a dynamic range of about 42 deciBels (dB) and a precision of about 2 dB. In this embodiment, the base sensors 121 include an accelerometer for each of three perpendicular directions to determine vibration of the pipeline with a precision of about ±10 milleGs (mg) for vibration frequencies below and overlapping the frequency range of the acoustic sensor. In this embodiment, the base sensors 121 include a hydrocarbon vapor sensor with a sensitivity of about ±500 parts per million (ppm). A perforated space adjacent to the sensor belt 110 allows vapor to pass under the closed cell insulation to the vapor detector.

The sensors described for the illustrated embodiment are low-cost, highly reliable commercial units. As assembled on the sensor belt 110 and base unit 120, the sensors are thermally and mechanically robust—capable of exposure to the arctic and desert environments during installation and servicing.

2.3.2 The Base Controller

The base controller 124 includes a processor 126, a transmitter 128 and a receiver 129 and controls use of the antenna 140, the visual signal device 150, and the sensors on sensor belt 110.

The processor 126 is used for processing the output signals from the base sensors 121 and the sensor controllers 118. Other elements of a computer system, described in more detail in the last section, may also be incorporated in base controller 124. For example, a memory is included in some embodiments to record data and sensor output received locally or commands received from other, remote units. The base controller 124 performs one or more functions similar to those performed by the sensor controllers 118, such as providing power to the base sensors 121 and sensor controllers 118, initializing the sensors 121 and sensor controllers 118, querying the sensors 121 and sensor controller 118 for data, and preparing data based on the output signals from the sensors 121 and data from controllers 118.

In some embodiments, the processor 126 in the base controller determines whether conditions of the pipeline and the monitoring apparatus 100 are normal based on signals from the sensors and controllers. If conditions are normal, the processor 126 generates a small amount of data indicating all is normal and communicates that data to an outside unit, using communication devices as described below. If conditions deviate from normal conditions by more than a threshold amount, then the processor 126 generates more data that indicates the output from one or more sensors or controllers and communicates that additional data to an outside unit. For example, the processor 126 provides data from a strain gauge that indicates stresses that exceed a threshold stress and data from neighboring strain gauges. In another embodiment, the processor 126 provides data from all sensors and controllers when conditions deviate from normal at any sensor.

In some embodiments, the processor queries the sensors and controllers on a regular schedule and provides data based on responses to those queries. In some embodiments, the processor queries the sensors and controllers in response to receiving a signal from an outside unit, communicated as described below, and provides data to the outside unit based on responses to those queries.

The base controller 124 also controls communications with other units, either other monitoring apparatuses, or other specialty units using a communications transmitter or receiver or both. For example, the base unit processor 126 determines whether the data obtained from sensors 121 and sensor controller 118 supports initiating some mending action and communicates data to outside units only when such action is indicated. In the illustrated embodiment, the base controller performs data communications functions with external units using transmitter 128 and receiver 129 and antenna 140. In the illustrated embodiment, radio frequency channels are used. In other embodiments other wireless communication channels may be used, such as optical and other electro-magnetic waves, acoustic wave and other vibration waves. In such embodiments antenna 140 may be omitted.

In addition to, or in lieu of, the data communication channels, other signals can be conveyed to passing vehicles or aircraft using a visual signal device 150, such as a low-power light emitting diode or a capacitor-charged Xenon flash lamp. For example, in some embodiments the Xenon lamp flashes when the pipeline and monitoring apparatus are healthy and shines continuously when the pipeline or monitoring apparatus should receive attention. In some embodiments, wired communications can also be used to communicate with external units, such as where the monitoring apparatus 100 is attached to a pipeline at a site near well-supported facilities, such as pump stations with their own electric generators and communications equipment.

For communicating with multiple other units, such as other monitoring apparatuses, each processor 126 is associated with a unique network address for network communications.

2.3.3 The Thermopile

In the illustrated embodiment, power for the sensors, processors, and communications is derived from a temperature difference between the fluid in the pipe and the ambient temperature of the environment outside the pipe. The piped fluid may be warmer or colder than the ambient temperature. For example, a thermopile 130 is employed to convert the temperature difference into an electric voltage to drive a current through the processors, sensors, and communications components. A thermopile is formed from several thermocouples. A thermocouple is formed by joining two materials with different electro-thermal responses. A thermocouple generates an electric voltage difference at the junction when the two materials are exposed to different temperatures. In the thermopile 130, many thermocouples are connected in series to sum the voltages from the individual thermocouples. One thermocouple 132a of thermopile 130 is brought into thermal contact with the pipeline, which is at a temperature close to that of the piped oil. The other thermocouple 132b of thermopile 130 is brought into thermal contact with the air outside the pipeline. In one embodiment, a thermopile adapted to high heat fluxes of about 10 Watts per square centimeter ($W/cm^2$) is used.

A useful temperature difference between the fluid inside the pipeline and the air outside the pipeline is often available. For example, oil is typically transported at a temperature elevated compared to the outside air. In the Trans-Alaskan pipeline the oil temperature is typically 150 degrees Fahrenheit (° F.), well above the ambient temperature, which is less than 72° F. In the Trans-Siberian pipeline, ambient temperatures are even lower. Crude oil transported in desert regions is superheated to about 450° F. to increase flow rates. This provides a significant temperature difference even for desert temperatures of 120° F.

Thermopiles free the monitoring apparatus 100 from reliance on wiring, batteries, solar panels, windmills and other problematic power sources.

In some embodiments, wired power and generators can also be used to provide power, such as where the monitoring apparatus 100 is attached to a pipeline at a site near well-supported facilities, such as pump stations.

2.4 Fabrication and Use of the Monitoring Apparatus

In some embodiments, the monitoring apparatus is fabricated in advance at a fabrication facility. In such embodiments, installation of the monitoring apparatus in the field is readily accomplished by attaching the apparatus to the outside of the pipeline. The installation is especially efficient when the apparatus includes the sensor belt 110 that can be wrapped around the outside of the pipeline at a location and inserted into the cinching mechanism 122. The cinching mechanism 122 is then operated to tighten the belt around the pipeline so that the sensors properly contact the skin of the pipeline. For example, the biting bands contact and rigidly attach to the skin of the pipeline when the cinching mechanism is activated.

The base controller 124 in the base unit apportions power to the sensor suite to repeatedly monitor the vessel health in its vicinity as power permits. In the case of overt actions, such as detection of one or more excessive values for one or more signals from the strain, temperature, acoustic, vibration and vapor sensors, the monitoring apparatus is event driven, and the base controller 124 awakens the communication circuitry, such as transmitter 128, to notify a pipeline manger, who is located at an external unit, of the event.

3. Monitored Pipeline

Figure 2:
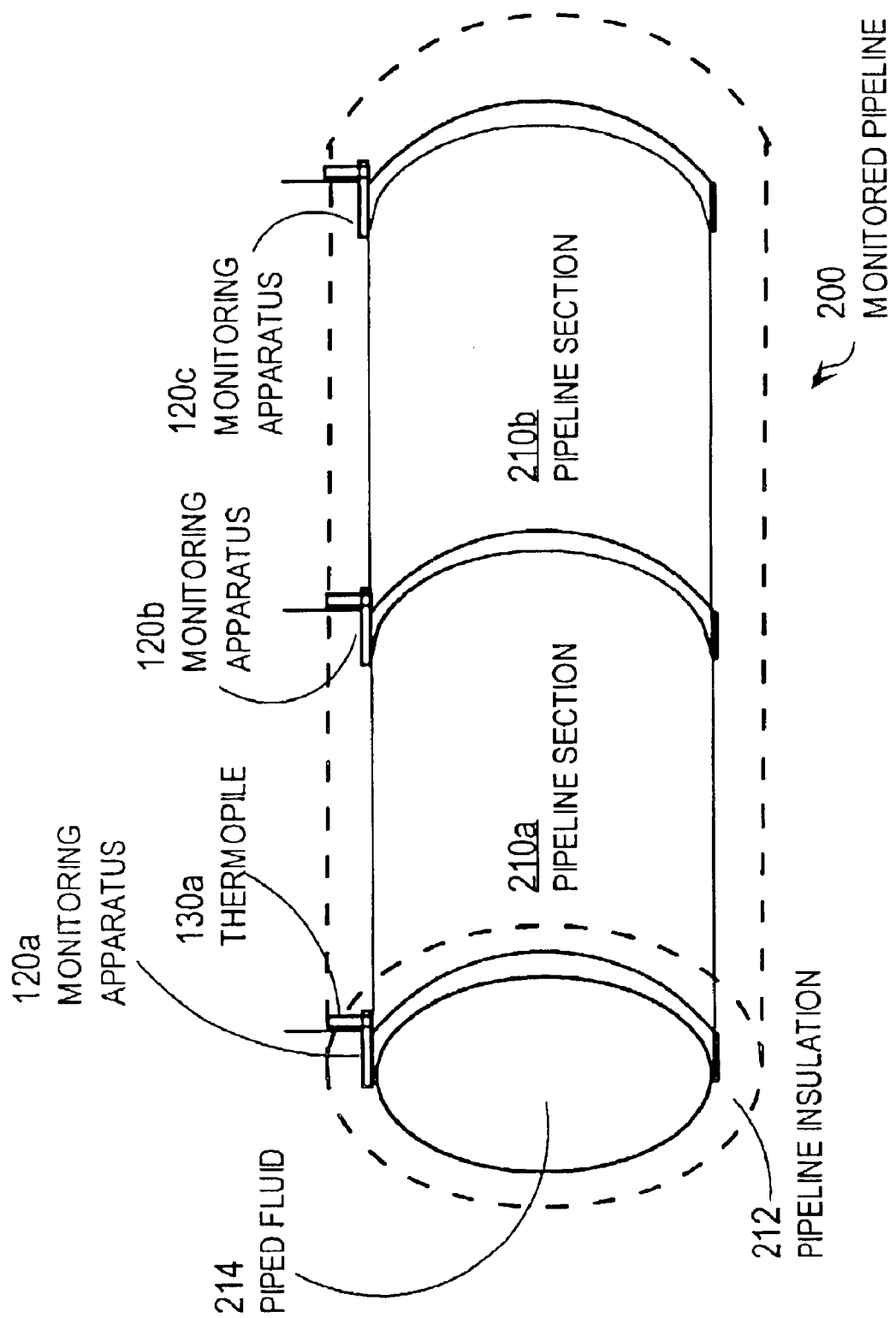
FIG. 2 is a block diagram that illustrates a monitored pipeline, according to an embodiment.

FIG. 2 is a block diagram that illustrates a monitored pipeline 200, according to an embodiment. A pipeline includes multiple pipeline sections, designated pipeline sections 210 hereinafter, such as pipeline sections 210a, 210b depicted in FIG. 2. Other pipeline sections of monitored pipeline 200 are not shown. The pipeline sections 210 are joined to adjacent pipeline sections by a weld along the entire circumference of the junction. For example, a weld joins pipeline section 210a to pipeline section 210b.

Often surrounding the pipeline sections 210 is a layer of pipeline insulation 212, which serves to reduce the transfer of heat from the piped fluid to the environment due to the temperature difference between the temperature of the piped fluid and the ambient temperature of the environment outside the pipeline. The insulation layer 212 may also provides some mechanical insulation for the pipeline against collisions with airborne debris. A piped fluid 214 flows through the pipeline sections 210 of the pipeline when the pipeline is in use.

According to some embodiments of the invention, a monitoring apparatus, such as apparatus 100, is attached to a pipeline to straddle a weld between adjacent pipeline sections 210. In the illustrated embodiment, monitoring apparatuses 100a, 100b, 100c are attached to straddle welds between pipeline sections 210a, 210b and adjacent pipeline sections, respectively. In other embodiments, one or more monitoring apparatuses, such as monitoring apparatus 100, are attached to the pipeline at locations other than welds.

It is considered preferable to attach the monitoring apparatuses at welds because failures are more likely to occur at welds. Due to the residual strains of the environment, including ground shifts, but particularly the cycles of freezing and thawing that occur in the arctic regions, strains and stresses accumulate at the joints between pipeline sections.

Where a layer of insulation 212 surrounds the pipeline, it is preferable that the thermopile extends from contact with the pipeline to a position where a thermocouple of the thermopile is exposed outside the layer of insulation 212. For example, as illustrated in FIG. 2, thermopile 130a extends from the pipeline through the layer of insulation 212.

In the illustrated embodiment, low power, radio frequency (RF) communications are used for the base unit of one monitoring apparatus to communicate with its nearest neighbors. A linear communication network is thus formed along the length of the pipeline with each monitoring apparatus serving as a node on the network. Each node has a unique network address. For pipelines that are not completely instrumented with monitoring apparatuses, a relay package with a processor (like processor 126), a transmitter (like transmitter 128) and a receiver (like receiver 129) powered by its own thermopile (like thermopile 130) may substitute for a complete monitoring apparatus as a network node. To guard against network failure due to failure of one node, the RF transmission should be effective at twice the nominal spacing between nodes. For pipeline sections forty feet long and a node at every weld location along the pipeline, RF transmissions with 80 feet of effective range are sufficient. This means that the base unit of one monitoring apparatus nominally communicates with its four nearest neighbors. Such short-range transmissions do not demand much power and are readily supported by available thermopiles.

Any query mode developed at the time of installing the monitoring apparatus may be employed to retrieve information from a node, such as output from an individual sensor, data from an individual sensor controller 118, data from an individual base unit 120, data from several base units associated with an actively supported facility, such as a pumping station, or data from all base units on the pipeline. At well-supported facilities, data can be transferred to other extant pipeline communications systems, such as powerful radio transmitters and satellite uplinks. A human user may also connect to the linear communications network anywhere along the pipeline, such as at either end of the pipeline, at a pumping station, or moving past the pipeline within the effective transmission distance in a properly equipped vehicle, such as a truck or helicopter.

Data communication rates are reasonable. For example, the Trans-Alaskan pipeline includes about 132,000 welds about 40 feet apart. For purposes of illustration, it is assumed that the data collected by the example monitoring apparatus described above at each weld includes about 50 strain measurements, 50 temperature measurements, acoustic data, vibration data, vapor detection data, and a node identification number that amounts to 1000 binary digits. Data from all 132,000 welds (about 14 million sensors) amounts to less than about 18 Megabytes (MB) of data (where a byte is about 8 bits and a MB is a million bytes). If the RF transmitters and receivers can pass this information at 9,600 baud (bytes per minute), which is readily available technology at the time of this writing, it would take less than about 4.5 hours to obtain data from all 14 million sensors. If the base controller is configured to deduce filtered data that indicates simple pass or fail for each sensor, then the entire download consumes less than about 40 minutes.

The monitoring apparatuses, such as apparatus 100, may be attached as each pipeline section 210 is welded to the pipeline during construction of the pipeline. For extant pipelines, it may be most cost effective to attach a monitoring apparatus at a weld as each weld is inspected during scheduled weld inspections. This approach reduces the burden on both maintenance crews and maintenance budgets. During normal inspection and repair cycles, an entire pipeline, such as the Trans-Alaskan pipeline would have a monitoring apparatus installed at each weld within a few years. Furthermore, because locations susceptible to damage receive scheduled visits sooner, welds at such locations would be instrumented more quickly.

4. Method for Monitoring Health of a Vessel

Figure 3:
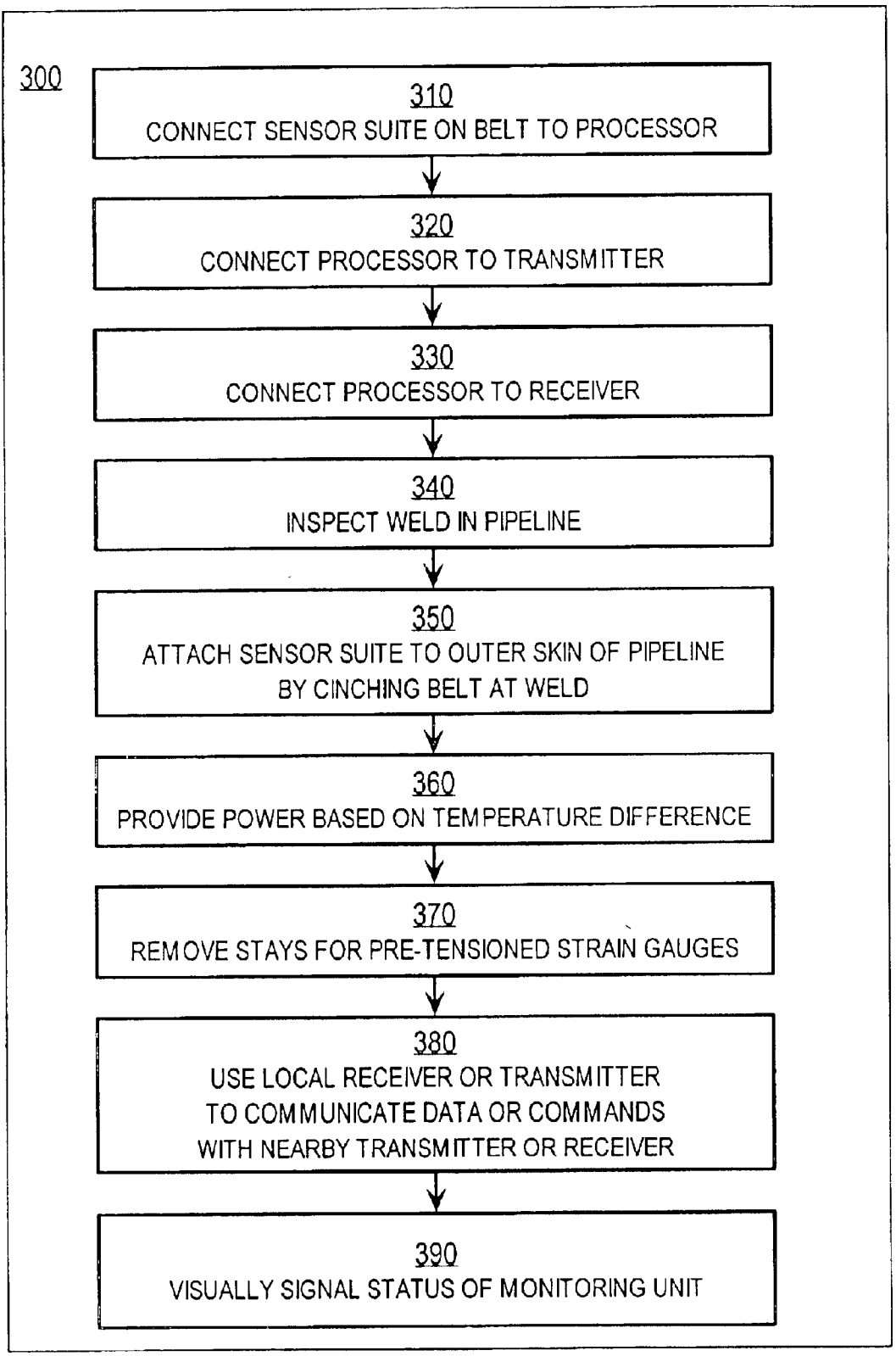
FIG. 3 is a flow diagram that illustrates a method for monitoring the health of a pipeline, according to an embodiment.

FIG. 3 is a flow diagram that illustrates a method 300 for monitoring the health of a pipeline, according to an embodiment. Although steps are shown in a particular order in FIG. 3 for purposes of illustration, in other embodiments the steps may be performed in a different order or overlapping in time. For example, connecting a thermopile to sensors, processor, radio receiver and transmitter as part of step 360 may be partly performed simultaneously with steps 310, 3120, 330 during a fabrication process at a factory, while providing power from the thermopile is performed after installation on the pipeline during step 350.

In step 310, a sensor suite on a sensor belt is connected to a processor on the base unit. For example, during factory fabrication, the biting bands 112 and cable 119 are connected to a Kapton strip, the strain gauges 114 and stays 116 are connected to the biting bands 112, the controllers 118 with temperature sensors are connected to the cable 119 and the Kapton strip, thus completing a sensor belt 110 with a sensor suite. In this example, the sensor belt 110 is attached to the base unit 120, and the cable 119 is electronically connected to the base controller 124 that includes the processor 126. In embodiments without a processor, step 310 may be omitted.

In step 320, the processor is also connected to the transmitter. For example, before, during or after step 310, a RF transmitter is installed in the base controller 124. In embodiments without a radio transmitter or processor, step 320 may be omitted.

In step 330, the processor is also connected to the receiver. For example, before, during or after steps 310 and 320, a RF receiver is installed in the base controller 124. In embodiments without a radio receiver or processor, step 330 may be omitted.

In step 340, a weld between two pipeline sections is inspected, for example as part of pipeline construction or scheduled, routine pipeline maintenance or pipeline repair. In some embodiments, such as embodiments in which a monitoring apparatus is installed at locations other than a weld, step 340 may be omitted.

In step 350, the sensor suite is attached to the outer skin of the pipeline. In the illustrated embodiment using sensor belt 110, the sensor suit is attached by circling the pipeline section or weld with the sensor belt 110, inserting belt tip 111 into slit 123 of cinching mechanism 122, and cinching the sensor belt 110 tight against the outer skin of the pipeline using the cinching mechanism 122. In the illustrated embodiment, the sensor belt is cinched at a location on the pipeline so that two biting bands 112 straddle a weld between two pipeline sections 210. Because attaching the sensor belt is so easy with the cinching mechanism, subsequent manual inspection of the weld can still be performed by momentarily removing and then reattaching the sensor belt 110. In some embodiments, the weld is left uncovered by the sensor belt 110, e.g., there is no Kapton fabric between the biting elements 112, so that subsequent visual inspection of the weld can be performed while the sensor belt 110 is in place.

In step 360, power is provided based on a temperature difference between a fluid 214 inside the pipeline and ambient temperature of the environment outside the pipeline. In the illustrated embodiment, this is accomplished by bringing one thermocouple 132a of thermopile 130 into contact with the outer skin of the pipeline and exposing another thermocouple 132b to the air outside the layer of insulation 212.

Step 360 includes electrically connecting the electric voltage terminals of the thermocouple 130 to the power supply terminals of the base controller 124 and cable 119 and base sensors 121. In some embodiments, electrically connecting the electric voltage terminals of the thermocouple 130 to the power supply terminals of the base controller 124 involves connecting the electric voltage terminals of the thermocouple 130 separately to power terminals for transmitter 128, receiver 129, processor 126, or one or more other components of base unit 120. In the illustrated embodiment, electric connections to terminals of the thermocouple 130 are performed during factory fabrication of the monitoring apparatus. In other embodiments, the electric connections are made after factory fabrication or in the field. Factory connections are preferred as quicker and more reliable than field connections. In embodiments that do not use thermopile power, step 360 may be omitted.

In step 370, stays are removed that maintain biting band spacing for pre-tensioned strain gauges. For example, during factory fabrication of the sensor belt 110, a cord is connected to stays 116 made of thin rigid bars with flanges that are engaged with groves in the biting bands 112. After the sensor belt 110 is cinched around the pipeline in step 350, the cord is pulled to extract the flanges from the groves; and, the stays are removed. Step 370 may be omitted in embodiments that do not use biting bands and pre-tensioned strain gauges.

In step 380, the local receiver and local transmitter of a local monitoring apparatus most recently attached in step 350 are used to communicate data with a remote transmitter or receiver that are not part of the local monitoring apparatus. Step 380 includes steps performed by the processor 126 to cycle power among components to maintain low power operation, to process commands received from a remote unit, to query local sensors 121 and controllers 118 of the local monitoring apparatus, to receive and process and store data from controllers 118 and output from sensors 121, to determine whether conditions deviate from normal conditions by more than a threshold, and to generate data for transmission to remote units. A remote unit may be another monitoring apparatus, a communications relay package, or an end user at a pipeline terminus, pumping station, or vehicle, or some combination of these units, among others. Data is communicated upon command, when a failure is detected, when a pipeline problem is detected, or on a specified periodic basis for downloading data the processor has recorded for the specified period. In the illustrated embodiment, the remote unit is within twice the nominal spacing between nodes of a linear communications network. Step 380 may be omitted in embodiments that do not use transmitter 128 or receiver 129 or processor 126.

In step 390, the status of the local monitoring apparatus is signaled using the visual signal device 150. For example, a flash lamp is fired intermittently when conditions of the pipeline and monitoring apparatus are normal, and shined continuously when the pipeline or monitoring apparatus deserves some attention. Step 390 may be omitted in embodiments that do not include the visual signal device 150.

Method 300 is repeated for each monitoring device to be installed on a pipeline. In some embodiments steps 320, 330, 350, 360, 380 and 390 are performed for communications relay packages, without a sensor suite, so that a linear network can be established between a monitoring apparatus and an actively supported facility like a pump station.

As described in the background section, manual inspections in harsh climatic areas is a very risky activity, dangerous to its participants, and prone to operator error because of the distractions imposed by the climate. The inspection process is also time consuming for the human inspectors, and is thus expensive to the pipeline companies. Using the techniques described above allows pipeline companies to only replace sections of pipe that need repair, rather than indiscriminately replacing pipe sections on a prescribed schedule, or performing frequent manual inspections in harsh climatic areas. Use of these techniques reduces overall upkeep costs by allowing maintenance to be scheduled and performed at the discretion of the pipeline company based on need. Repair crews may therefore provide proactive preventative maintenance during safer weather conditions rather than performing emergency repairs in harsh conditions in reaction to a pipeline failure. Furthermore, because a monitored pipeline can be monitored remotely over the linear network, or from a passing vehicle, in-situ manual inspections can be reduced. This reduces manpower costs and the risks of injury during hazardous weather conditions. Furthermore, the monitoring includes measurements of corrosion and third party damage via acoustic and vibration sensors so that the likelihood of undetected leaks is substantially reduced. The reduction in the likelihood of leaks is not only a cost benefit to those transporting fluids through the pipelines and cleaning up spills, but is also a benefit to the environment and the population surrounding the pipeline areas.

5. Hardware Overview

Figure 4:
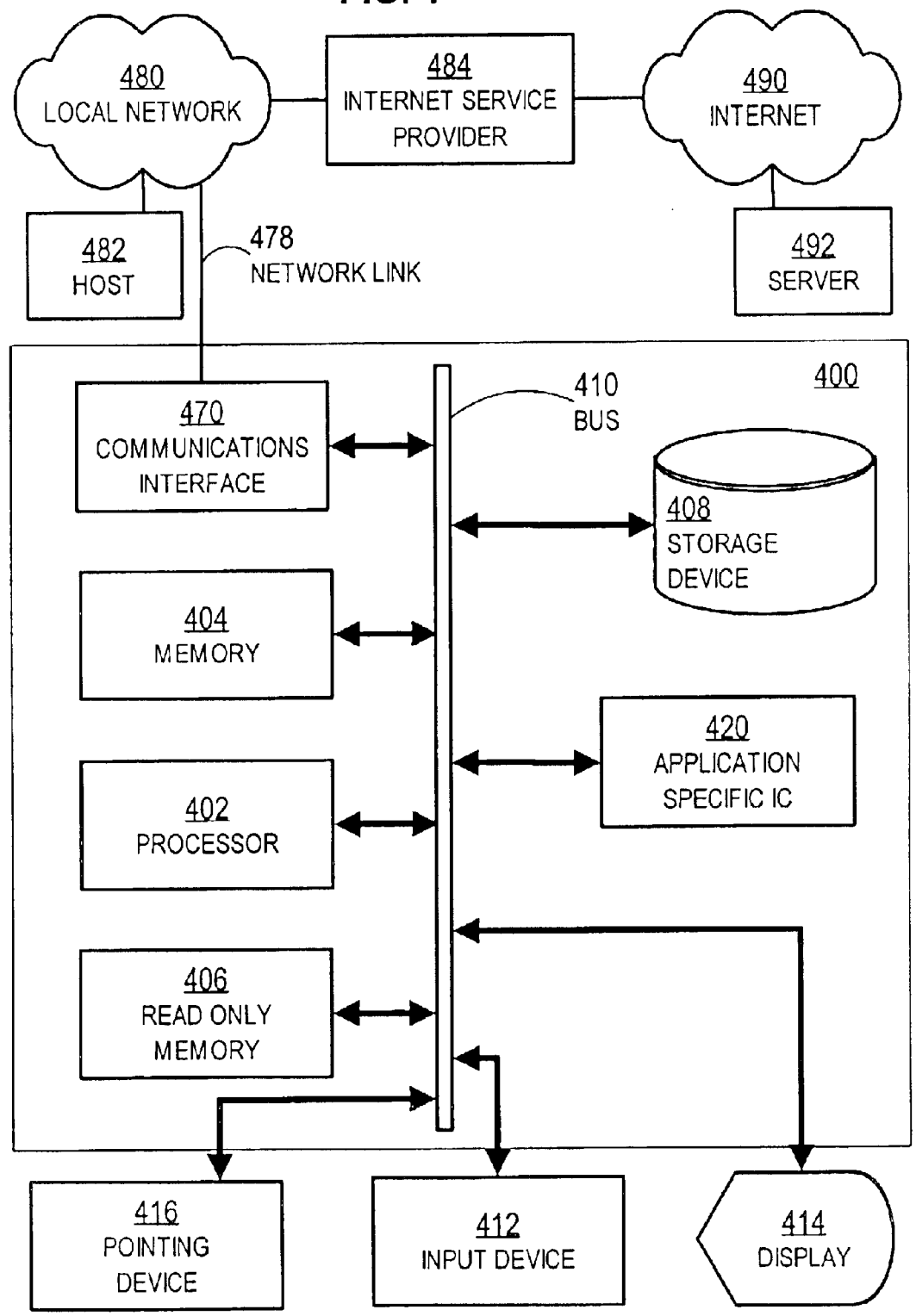
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a communication mechanism such as a bus 410 for passing information between other internal and external components of the computer system 400. Information is represented as physical signals of a measurable phenomenon, typically electric voltages, but including, in other embodiments, such phenomena as magnetic, electromagnetic, pressure, chemical, molecular and atomic interactions. For example, north and south magnetic fields, or a zero and non-zero electric voltage, represent two states (0, 1) of a binary digit (bit). A sequence of binary digits constitutes digital data that is used to represent a number or code for a character. A bus 410 includes many parallel conductors of information so that information is transferred quickly among devices coupled to the bus 410. One or more processors 402 for processing information are coupled with the bus 410. A processor 402 performs a set of operations on information. The set of operations include bringing information in from the bus 410 and placing information on the bus 410. The set of operations also typically include comparing two or more units of information, shifting positions of units of information, and combining two or more units of information, such as by addition or multiplication. A sequence of operations to be executed by the processor 402 constitute computer instructions.

Computer system 400 also includes a memory 404 coupled to bus 410. The memory 404, such as a random access memory (RAM) or other dynamic storage device, stores information including computer instructions. Dynamic memory allows information stored therein to be changed by the computer system 400. RAM allows a unit of information stored at a location called a memory address to be stored and retrieved independently of information at neighboring addresses. The memory 404 is also used by the processor 402 to store temporary values during execution of computer instructions. The computer system 400 also includes a read only memory (ROM) 406 or other static storage device coupled to the bus 410 for storing static information, including instructions, that is not changed by the computer system 400. Also coupled to bus 410 is a non-volatile (persistent) storage device 408, such as a magnetic disk or optical disk, for storing information, including instructions, that persists even when the computer system 400 is turned off or otherwise loses power.

Information, including instructions, is provided to the bus 410 for use by the processor from an external input device 412, such as a keyboard containing alphanumeric keys operated by a human user, or a sensor. A sensor detects conditions in its vicinity and transforms those detections into signals compatible with the signals used to represent information in computer system 400. Other external devices coupled to bus 410, used primarily for interacting with humans, include a display device 414, such as a cathode ray tube (CRT) or a liquid crystal display (LCD), for presenting images, and a pointing device 416, such as a mouse or a trackball or cursor direction keys, for controlling a position of a small cursor image presented on the display 414 and issuing commands associated with graphical elements presented on the display 414.

In the illustrated embodiment, special purpose hardware, such as an application specific integrated circuit (IC) 420, is coupled to bus 410. The special purpose hardware is configured to perform operations not performed by processor 402 quickly enough for special purposes. Examples of application specific ICs include graphics accelerator cards for generating images for display 414, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 400 also includes one or more instances of a communications interface 470 coupled to bus 410. Communication interface 470 provides a two-way communication coupling to a variety of external devices that operate with their own processors, such as printers, scanners and external disks. In general the coupling is with a network link 478 that is connected to a local network 480 to which a variety of external devices with their own processors are connected. For example, communication interface 470 may be a parallel port or a serial port or a universal serial bus (USB) port on a personal computer. In some embodiments, communications interface 470 is an integrated services digital network (ISDN) card or a digital subscriber line (DSL) card or a telephone modem that provides an information communication connection to a corresponding type of telephone line. In some embodiments, a communication interface 470 is a cable modem that converts signals on bus 410 into signals for a communication connection over a coaxial cable or into optical signals for a communication connection over a fiber optic cable. As another example, communications interface 470 may be a local area network (LAN) card to provide a data communication connection to a compatible LAN, such as Ethernet. Wireless links may also be implemented. For wireless links, the communications interface 470 sends and receives electrical, acoustic or electromagnetic signals, including infrared and optical signals, that carry information streams, such as digital data. Such signals are examples of carrier waves.

The term computer-readable medium is used herein to refer to any medium that participates in providing instructions to processor 402 for execution. Such a medium may take many forms, including, but not limited to, non-volatile media, volatile media and transmission media. Non-volatile media include, for example, optical or magnetic disks, such as storage device 408. Volatile media include, for example, dynamic memory 404. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape, or any other magnetic medium, a compact disk ROM (CD-ROM), or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Network link 478 typically provides information communication through one or more networks to other devices that use or process the information. For example, network link 478 may provide a connection through local network 480 to a host computer 482 or to equipment 484 operated by an Internet Service Provider (ISP). ISP equipment 484 in turn provides data communication services through the public, world-wide packet-switching communication network of networks now commonly referred to as the Internet 490. A computer called a server 492 connected to the Internet provides a service in response to information received over the Internet. For example, server 492 provides information representing video data for presentation at display 414.

Some embodiments use computer system 400 for implementing one or more steps of the techniques described herein. According to one embodiment of the invention, those steps are performed by computer system 400 in response to processor 402 executing one or more sequences of one or more instructions contained in memory 404. Such instructions, also called software and program code, may be read into memory 404 from another computer-readable medium such as storage device 408. Execution of the sequences of instructions contained in memory 404 causes processor 402 to perform the method steps described herein. In alternative embodiments, hardware, such as application specific integrated circuit 420, may be used in place of or in combination with software to implement the invention. Thus, embodiments of the invention are not limited to any specific combination of hardware and software.

The signals transmitted over network link 478 and other networks through communications interface 470, which carry information to and from computer system 400, are exemplary forms of carrier waves. Computer system 400 can send and receive information, including program code, through the networks 480, 490 among others, through network link 478 and communications interface 470. In an example using the Internet 490, a server 492 transmits program code for a particular application, requested by a message sent from computer 400, through Internet 490, ISP equipment 484, local network 480 and communications interface 470. The received code may be executed by processor 402 as it is received, or may be stored in storage device 408 or other non-volatile storage for later execution, or both. In this manner, computer system 400 may obtain application program code in the form of a carrier wave.

Various forms of computer readable media may be involved in carrying one or more sequence of instructions or data or both to processor 402 for execution. For example, instructions and data may initially be carried on a magnetic disk of a remote computer such as host 482. The remote computer loads the instructions and data into its dynamic memory and sends the instructions and data over a telephone line using a modem. A modem local to the computer system 400 receives the instructions and data on a telephone line and uses an infra-red transmitter to convert the instructions and data to an infra-red signal, a carrier wave serving as the network link 478. An infrared detector serving as communications interface 470 receives the instructions and data carried in the infrared signal and places information representing the instructions and data onto bus 410. Bus 410 carries the information to memory 404 from which processor 402 retrieves and executes the instructions using some of the data sent with the instructions. The instructions and data received in memory 404 may optionally be stored on storage device 408, either before or after execution by the processor 402.

In the foregoing specification, the invention has been described with reference to specific embodiments thereof. It will, however, be evident that various modifications and changes may be made thereto without departing from the broader spirit and scope of the invention as expressed in the attached claims and their equivalents. The specification and drawing are, accordingly, to be regarded in an illustrative rather than a restrictive sense.

What is claimed is:

1. A method of monitoring health of a vessel that contains fluid at non-ambient temperatures, comprising:

attaching a sensor suite of one or more sensors to an outer skin of the vessel; and providing power for the sensor suite, based on a temperature difference between a fluid temperature of a contained fluid inside the vessel and an ambient temperature outside the vessel wherein at least one sensor of the sensor suite is attached at a weld between successive sections of the vessel.

2. The method as recited in claim 1, wherein a layer of insulation separates the outer skin of the vessel from an environment at the ambient temperature.

3. The method as recited in claim 1, said step of providing power based on a temperature difference between a fluid temperature of a contained fluid inside the vessel and an ambient temperature outside the vessel and further comprising providing electricity by attaching a first thermocouple of a thermopile to the outer skin of the vessel and exposing a different, second thermocouple of the thermopile to the ambient temperature.

4. The method as recited in claim 1, wherein:

the method further comprises connecting the sensor suite to a transmitter to communicate data based on sensor output from the sensor suite to a receiver; and said step of providing power for the sensor suite further comprises providing power for the transmitter.

5. The method as recited in claim 4, further comprising providing a plurality of communication relays at a corresponding plurality of locations along the vessel, each relay including a receiver and a transmitter for communicating the data based on the sensor suite; and providing power for each communication relay of the plurality of communication relays based on a temperature difference between the contained fluid inside the vessel and an ambient temperature outside the vessel in the vicinity of the communication relay.

6. The method as recited in claim 5, further comprising attaching a corresponding sensor suite to the outer skin of the vessel in the vicinity of each communication relay of the plurality of communication relays;

connecting the corresponding sensor suite to a transmitter in the corresponding communication relay to communicate data based on sensor output from the corresponding sensor suite; and said step of providing power for each communication relay further comprises providing power for the corresponding sensor suite based on the temperature difference between the contained fluid inside the vessel and the ambient temperature outside the vessel in the vicinity of the communication relay.

7. The method as recited in claim 6, wherein the corresponding plurality of locations along the vessel are associated with a plurality of welds between successive sections of the vessel.

8. The method as recited in claim 1, wherein:

the method further comprises connecting the sensor suite to a processor to generate data based on sensor output from the sensor suite; and said step of providing power for the sensor suite further comprises providing power for the processor.

9. The method as recited in claim 8, further comprising configuring the processor to determine whether output from the sensor suite deviates by more than a threshold amount form a baseline output that is associated with normal conditions for the vessel.

10. The method as recited in claim 1, wherein the at least one sensor of the sensor suite attached is one of a strain gauge and a stress gauge.

11. The method as recited in claim 1, wherein:

the method further comprises inspecting a weld of an existing vessel during a scheduled inspection; and said steps of attaching the sensor suite and providing power for the sensor suite are performed during the scheduled inspection.

12. The method as recited in claim 1, said step of attaching the sensor suite further comprising cinching around the vessel a belt that contains the sensor suite.

13. The method as recited in claim 12, said step or cinching the belt causes two ends of a strain gauge to become rigidly attached to the outer skin of the vessel.

14. The method as recited in claim 12, wherein the two ends of the strain gauge become rigidly attached to the outer skin of the vessel on opposite sides of the weld between successive sections of the vessel.

15. The method as recited in claim 1, wherein the sensor suite includes at least one of a strain gauge, a stress gauge, a temperature sensor, a corrosion sensor and a leak detector that detects a product of the contained fluid.

16. A method of monitoring health of a vessel that contains a fluid, comprising:

cinching around an outer skin of the vessel, at a weld between successive sections of the vessel, a belt that contains a sensor suite of one or more sensors, wherein said step of cinching the belt causes two ends of a strain gauge in the sensor suite to become rigidly attached to the outer skin of the vessel on opposite sides of the weld.

17. An apparatus for monitoring health of a vessel that contains a fluid, comprising:

a belt for cinching around an outer skin of the vessel at a location along the vessel, wherein the belt further comprises a plurality of biting members for rigidly attaching to the outer skin of the vessel when the belt is cinched around the vessel, and a strain gauge for measuring change in distance between two ends of the strain gauge, each end of the two ends rigidly attached to a different one of the plurality of biting member.

18. The apparatus as recited in claim 17, wherein:

the strain gauge is under tension; and the belt further comprises a removable stay that prevents changing a distance between the plurality of biting members due to the tension from the strain gauge until after the belt is cinched around the vessel.

19. The apparatus as recited in claim 17, wherein at least one of the plurality of biting members includes a band substantially parallel to a longitudinal axis of the belt.

20. The apparatus as recited in claim 17, wherein each biting member of the plurality of biting members includes a band substantially parallel to a longitudinal axis of the belt.

21. The apparatus as recited in claim 19, wherein the strain gauge is substantially perpendicular to the band.

22. The apparatus as recited in claim 18, wherein:

at least one of the plurality of biting members includes a band substantially parallel to a longitudinal axis of the belt; and the removable stay is a bar substantially perpendicular to the hand.

23. The apparatus as recited in claim 18, further comprising a thermopile that generates power based on a temperature difference between a first thermocouple of the thermopile and a second thermocouple of the thermopile, wherein:

the first thermocouple is connected to the belt for making thermal contact with the outer skin of the vessel;

the second thermocouple is configured for exposure to an ambient temperature of an environment outside the vessel; and power generated by the thermocouple powers the strain gauge.

24. The apparatus as recited in claim 23, further comprising a local transmitter communicatively connected to the strain gauge for communicating first data based on output from the strain gauge to a distant receiver, wherein power generated by the thermocouple powers the local transmitter.

25. The apparatus as recited in claim 24, further comprising a local receiver communicatively connected to the local transmitter, the local receiver for receiving second data from a distant transmitter based on output from a distant strain gauge, wherein power generated by the thermocouple powers the local receiver.

26. The apparatus as recited in claim 24, further comprising a local processor communicatively connected to the strain gauge and the local transmitter for generating the first data based on output from the strain gauge, wherein power generated by the thermocouple powers the local processor.

27. An apparatus for monitoring health of a vessel that contains a fluid, comprising:

a belt for cinching around an outer skin of the vessel at a location along the vessel, wherein the belt includes a sensor suite of one or more sensors for measuring properties related to the health of the vessel; and a thermopile that generates power based on a temperature difference between a first thermocouple of the thermopile and a second thermocouple of the thermocouple, wherein:

the first thermocouple is connected to the belt for making thermal contact with the outer skin of the vessel;

the second thermocouple is configured for exposure to an ambient temperature of an environment outside the vessel; and power generated by the thermocouple powers the sensor suite.

28. The apparatus as recited in claim 27, further comprising a local transmitter communicatively connected to the sensor suite for communicating first data based on output from the sensor suite to a distant receiver, wherein power generated by the thermocouple powers the local transmitter.

29. The apparatus as recited in claim 28, further comprising a local receiver communicatively connected to the local transmitter, the local receiver for receiving second data from a distant transmitter based on output from a distant sensor suite, wherein power generated by the thermocouple powers the local receiver.

30. The apparatus as recited in claim 28, further comprising a local processor communicatively connected to the sensor suite and the local transmitter for generating the first data based on output from the sensor suite, wherein power generated by the thermocouple powers the local processor.

31. A pipeline, comprising:

a plurality of pipe sections welded together;

a belt cinched around an outer skin of a pipe section at a location along the pipeline, wherein the belt further comprises a plurality of biting members rigidly attached to the outer skin of the pipeline, and a strain gauge for measuring change in distance between two ends of the strain gauge, each end of the two ends rigidly attached to a different one of the plurality of biting members.

32. The pipeline as recited in claim 31, wherein:

a belt is cinched around each weld of a plurality of welds between adjacent sections of the plurality of pipe sections in the pipeline; and each belt further comprises a plurality of biting members and a strain gauge rigidly attached to a different one of the plurality of biting members.

33. A pipeline, comprising:

a plurality of pipe sections welded together;

a belt cinched around an outer skin of a pipe section at a location along the pipeline, wherein the belt further comprises a sensor suite of one or more sensors for measuring properties related to health of the pipeline; and a thermopile that generates power based on a temperature difference between a first thermocouple of the thermopile and a second thermocouple of the thermopile, wherein:

the first thermocouple is connected to the belt in thermal contact with the outer skin of the pipeline;

the second thermocouple is exposed to an ambient temperature of an environment outside the pipeline; and power generated by the thermocouple powers the sensor suite.

34. The pipeline as recited in claim 33, wherein:

the pipeline further comprises a layer of thermal insulation wrapped around the plurality of pipe sections; and the second thermocouple is exposed to an ambient temperature of an environment outside the layer of thermal insulation.

* * * * *

UNITED STATES PATENT AND TRADEMARK OFFICE
CERTIFICATE OF CORRECTION

PATENT NO.    : 6,834,556 B2
DATED         : December 28, 2004
INVENTOR(S)   : Russell P. Cain, Bliss G. Carkhuff and John M. Bacon It is certified that error appears in the above-identified patent and that said Letters Patent is hereby corrected as shown below:

Column 19,
Line 60, delete the second occurrence of "thermocouple" and insert therefor
-- thermopile --.

Signed and Sealed this

Nineteenth Day of April, 2005

JON W. DUDAS
*Director of the United States Patent and Trademark Office*